May 15, 1928. 1,669,422
W. H. OPITZ
VISIBLE LIQUID MEASURING DEVICE
Filed Jan. 22, 1920 4 Sheets-Sheet 1
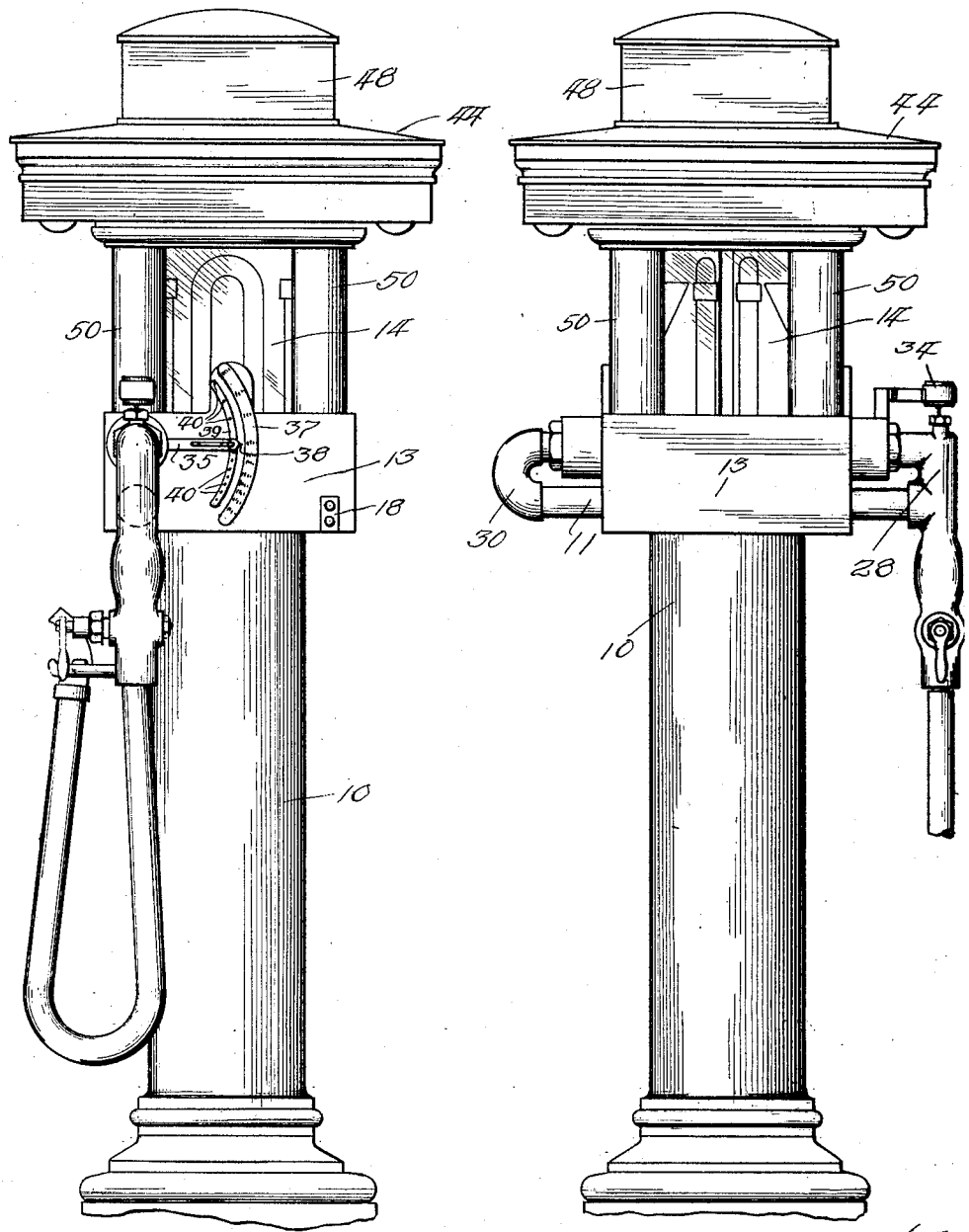

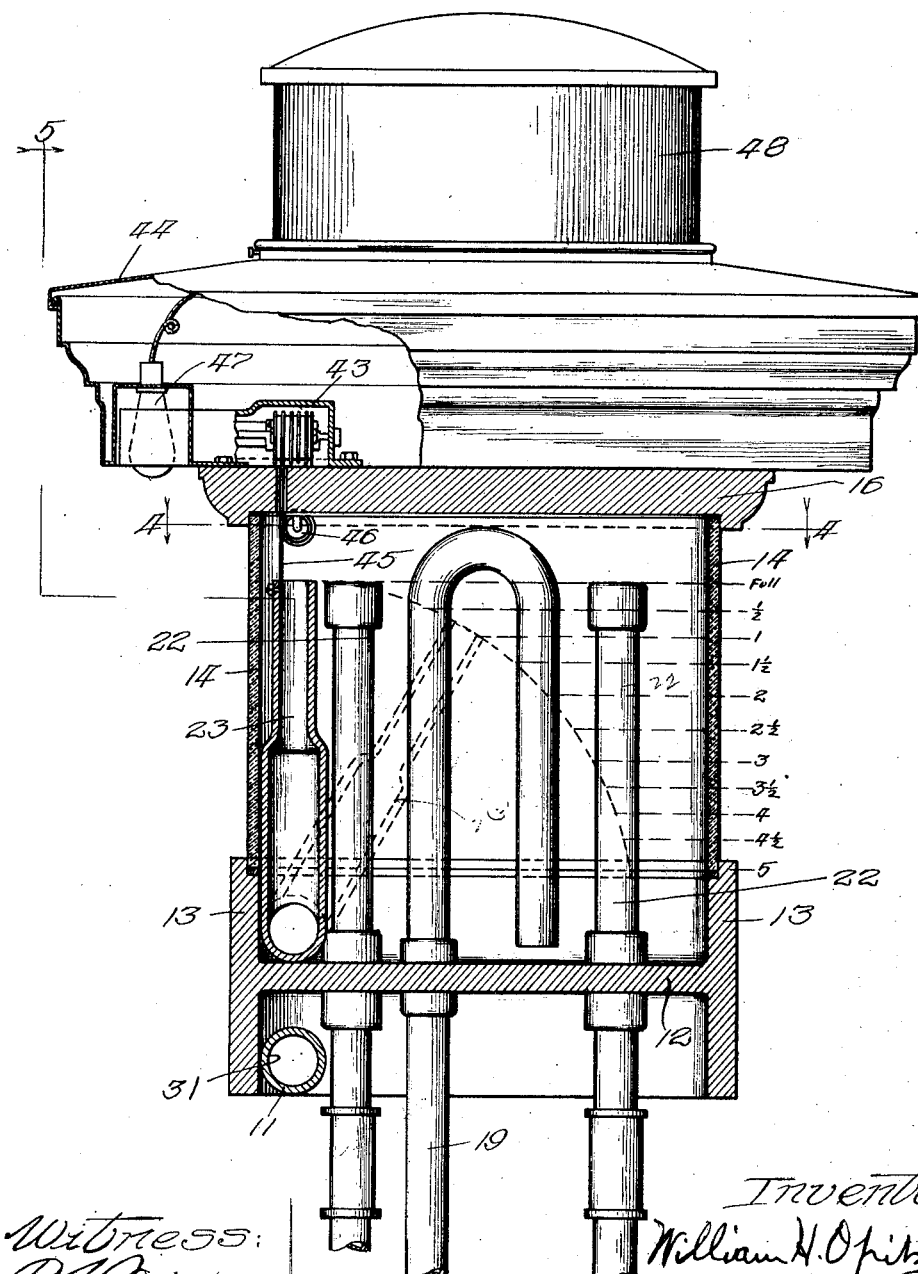

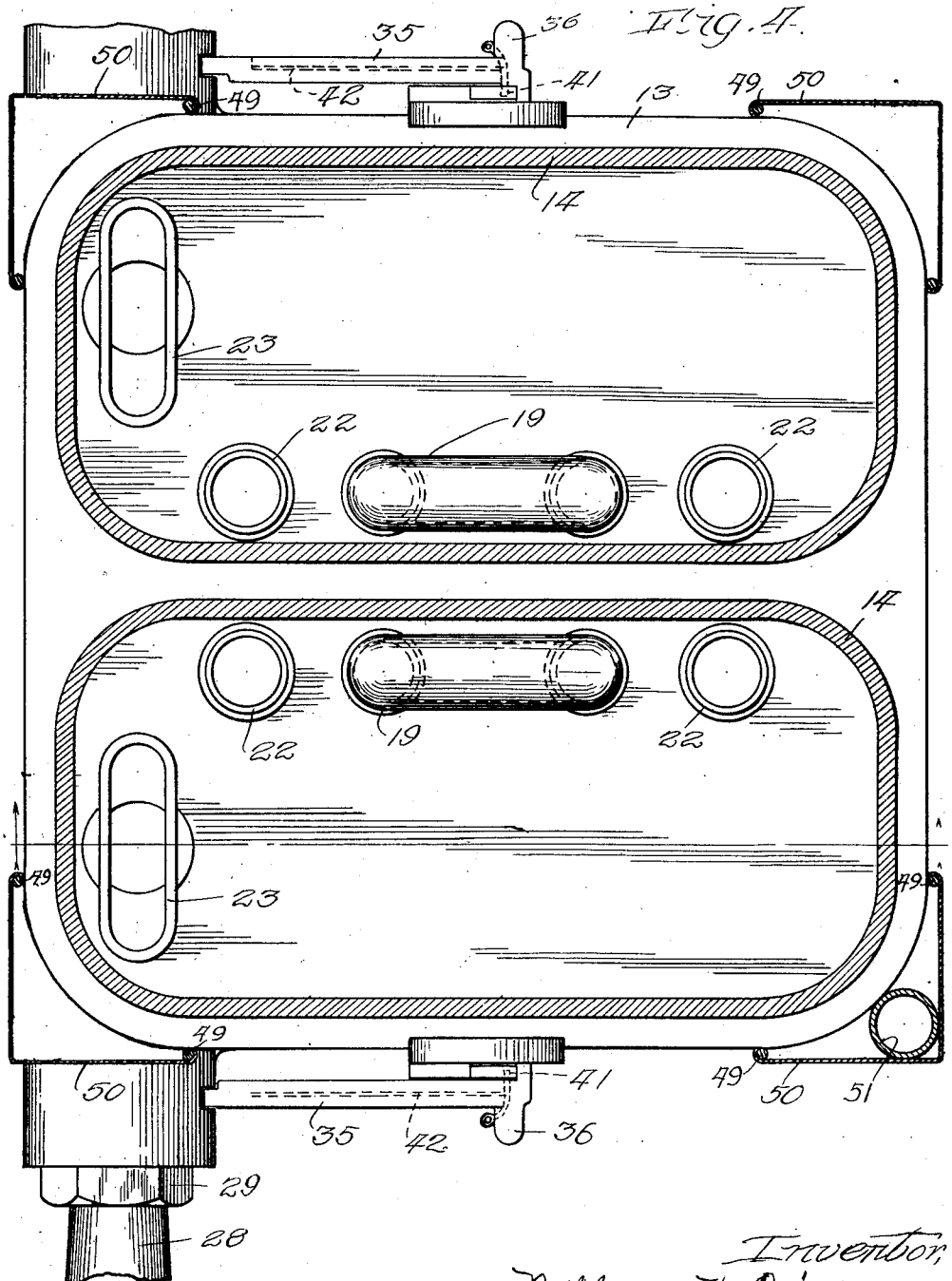

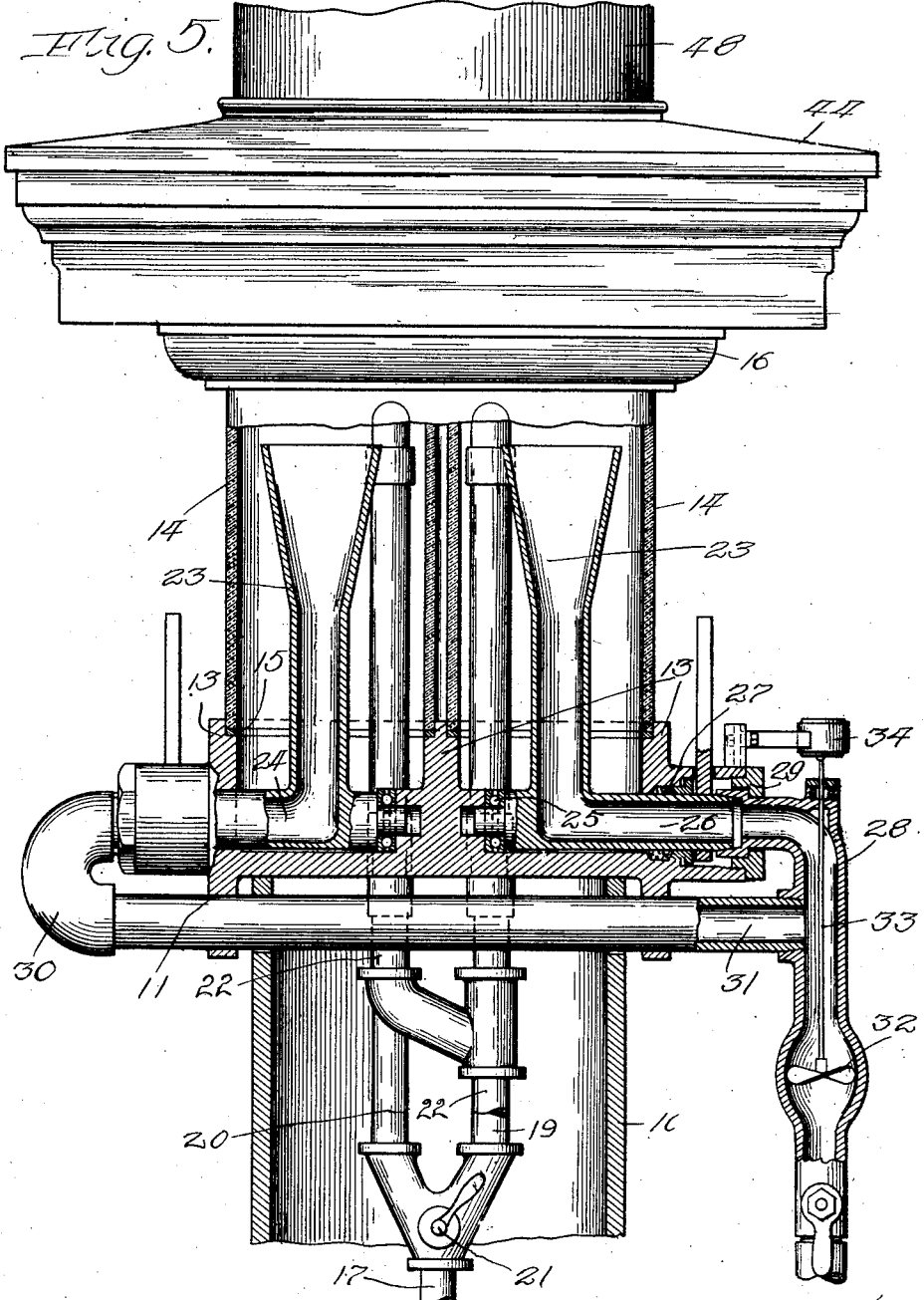

Patented May 15, 1928.

1,669,422

UNITED STATES PATENT OFFICE.

WILLIAM H. OPITZ, OF FORT WAYNE, INDIANA, ASSIGNOR TO S. F. BOWSER & COMPANY, INC., OF FORT WAYNE, INDIANA, A CORPORATION OF INDIANA.

VISIBLE LIQUID-MEASURING DEVICE.

Application filed January 22, 1920. Serial No. 353,168.

This invention has for its object the provision of a device of the character named which shall be of improved construction and operation.

The invention is exemplified in the combination and arrangement of parts shown in the accompanying drawings and described in the following specification, and it is more particularly pointed out in the appended claims.

In the drawings—

Fig. 1 is an elevation of a measuring device showing one embodiment of the present invention and a mounting for the same;

Fig. 2 is an elevation looking from the left in Fig. 1;

Fig. 3 is a vertical section through one of the measuring receptacles of the device shown in Figs. 1 and 2;

Fig. 4 is a horizontal section substantially on line 4—4 of Fig. 3; and

Fig. 5 is a vertical section substantially on line 5—5 of Fig. 3.

In dispensing liquids, such as gasoline, to the public it is desirable that the dispensing apparatus shall be capable of handling the liquid conveniently and without waste and that it shall operate so that the purchaser may be assured of full measurement.

In the embodiment of the invention illustrated in the drawings a suitable pedestal 10 is provided which carries a member 11 which may be of cast iron or other suitable material and which is provided with a horizontal plate 12 arranged to form the bottom of the measuring vessels for the liquid to be dispensed. Flanges 13 project upwardly from the plate 12 and form seats for hollow casings 14 which are preferably of glass to permit the interior portions of the measuring vessels to be seen from the outside. The glass cases 14 are cemented in their seats by any suitable material shown at 15 to form liquid-tight joints with the flanges 13. The upper ends of the cases 14 are similarly seated in a top plate 16. The measuring vessels formed by the glass cases 14 and the upwardly projecting flanges 13 are preferably arranged in duplicate so that one vessel may be filled while the other is being discharged. The liquid to be dispensed is drawn from a suitable storage vessel, preferably an underground tank, through a filling pipe 17 by means of any suitable form of pump, not shown. The filling pump may be operated by electricity and a switch for starting and stopping the pump may be located in a convenient place on the frame of the dispensing apparatus, as shown at 18 in Fig. 1. The filling pipe 17 is provided with two branches 19 and 20, one for each of the dispensing vessels, and a valve 21 is arranged for directing the filling liquid into either one of the vessels. The filling pipes 19 and 20 pass through the bottom plate 12 of the dispensing vessels to form liquid-tight joints with the plate 12. The pipes extend upwardly to the tops of the vessels and are rebent so that the discharge ends of the pipes are adjacent the upper surface of the plate 12. This arrangement prevents any danger of leakage through the filling pipes. Each of the dispensing vessels is provided with a pair of overflow pipes 22, the upper ends of which are open and determine the upper level of the surface of liquid in the dispensing vessels when the vessels are full. The overflow pipes are arranged to return any liquid passing through them to the storage tank.

In each of the measuring vessels is a pivoted discharge spout 23 which communicates with a short pipe section 24 having a roller journal bearing 25 at one end supported by the central flange 13 and having the other end tapered, as shown at 26, and extending through a packed joint 27 in the outer flange 13. The tapered end 26 of the pipe section 24 has a swivel connection with a hose coupling 28 which is held in place by a threaded nut 29 so that a liquid-tight joint is maintained between the pipe 24 and the coupling 28 and so that the pipe 24 may oscillate about its axis. The pipe 24 of the rear vessel is provided with a joint similar to that described in connection with the pipe 24 of the front vessel and a U-connection 30 is provided instead of the hose coupling 28, the U-connection being arranged to communicate through a pipe 31 with the hose coupling 28 so that both vessels may discharge independently of one another through the single hose coupling 28. A blade 32 is provided in the hose coupling 28 and is connected by a shaft 33 with a motor 34 so that the blade 32 may be driven to positively force the liquid from the hose coupling and the connecting hose secured thereto. Said motor 34 may be operated either by switch buttons located conveniently near said motor, or may be governed by a set of wire terminals inside of recesses 40 so that when pin 41 enters one of the recesses 40, said pin makes contact with the corresponding terminal and thus starts the motor.

An operating lever 35 is connected with the pipe 24 and extends through an opening in the casing surrounding the projecting end of this pipe and is provided with a handle 36 by means of which it may be swung about the axis of the pipe 24 to rotate the discharge spout 23 to various positions, as indicated in Fig. 3. An indicating scale 37 and a pointer 38 serve to show the position of the spout 23 in the dispensing vessel. A segment 39 with spaced holes 40 is arranged adjacent the path of movement of the lever 35 and a pin 41 is carried by the lever 35 and provided with a spring 42 normally tending to press the pin 41 against the segment 39 and into the openings in the segment. By this arrangement the discharge spout 23 may be held in various positions of adjustment in the dispensing vessel, and these positions correspond to fixed quantities of liquid to be discharged. When the discharge spout 23 is in a vertical position the vessel may be entirely filled to a level with the upper ends of the overflow pipes 22 and no liquid will enter the open end of the spout 23. When the handle 35 is rotated to swing the spout 23 to its first position, indicated by an opening 40 in the segment 39 and by suitable designation upon the segment 37, a predetermined quantity of liquid will be discharged through the spout, and different quantities will be discharged for the various other positions of the handle 35 and the spout 23. The openings 40 may be arranged in the segment 39 to correspond to any suitable unit of measure, such as gallons and one-half gallons.

In operating the device it will be understood that the spout 23 should be returned to its upper position after each discharging operation so that there will be no danger of liquid escaping through the spout while the vessel is being refilled. This is true even though the valve in the hose connection 28 is closed, for if the spout 23 remains in an inclined position during filling the spout and connected parts would be filled with liquid, although the escape of liquid might be prevented by the closed valve. The openings 40 are preferably arranged to correspond to quantities of liquid measured independently of the opening in the spout 23 and its associated passages so that if the spout is filled with liquid during the filling operation the amount required for filling this space will be in excess of the amount measured.

In order to register the quantity of liquid dispensed a meter 43 is mounted in the space provided by the sheet metal cornice 44 which covers the dispensing device, and the meter is connected with the spout 23 by a flexible band 45 passing over a guide pulley 46. The apparatus may be suitably illuminated by lights 47 arranged beneath the cornice, and preferably a transparent cylinder 48 having enclosed lights is mounted on top of the cornice. The metal parts 13 and 16 are suitably clamped on the glass cases 14 by rods 49 arranged at the corners of the device and these rods may hold sheet metal casing members 50, as shown in the drawings. A conduit pipe 51 is arranged in one of the casing members 50.

The rear vessel is provided with an operating handle 35 similar to that described in connection with the front vessel and the glass cases 14 may be graduated, if desired, to indicate the amount of liquid contained within the vessels, the graduations being preferably arranged to count from the full position as the zero mark.

I claim :—

1. A liquid dispensing apparatus comprising a base plate having upwardly projecting flanges a transparent vessel supported on said flanges, a discharge spout in said vessel, bearings in said flanges for pivotally mounting said discharge spout, and means for swinging said discharge spout about its pivotal mounting for positioning its intake end at different elevations in said vessel.

2. In a liquid dispensing apparatus, a pair of vessels, a bottom plate common to both of said vessels, upwardly projecting flanges on said bottom plate for supporting said vessels, one of said flanges separating the vessels one from another and having journaled bearings formed on opposite sides thereof for pivotally supporting a discharge spout in each of the vessels, discharge pipes communicating with each of said discharge spouts and projecting through the opposite flanges on said bottom plate, and means for swinging said discharge spouts about their pivotal mountings for presenting their intake ends at adjusted elevations in said vessels.

3. A liquid dispensing apparatus comprising a base plate having upwardly projecting flanges a transparent vessel supported on said flanges, means for introducing a liquid into said vessel comprising a pipe projecting through said base plate and extending upwardly to a point adjacent the top of the vessel and then downwardly to terminate with the discharge end adjacent said base plate, an overflow pipe projecting through said base plate and terminating at a predetermined elevation within the receptacle, and means for drawing off predetermined quantities of liquid introduced into said receptacle comprising a discharge spout, a journal bearing formed on the inside of one of said upwardly projecting flanges on the base plate to provide a pivotal mounting for said discharge spout, a pipe section communicating with said discharge spout and projecting through another upwardly projecting flange on the base plate, a stuffing box for the projecting length of said discharge pipe, said stuffing box providing a journal bearing for mounting said discharge pipe with freedom of rotation and co-operating with said first-named journal bearing to support the discharge spout whereby the same may be swung about a horizontal axis to position its intake end at adjustable elevations within the vessel.

4. In a liquid dispensing apparatus, a pedestal, a plurality of transparent vessels and means for supporting said vessels upon said pedestal comprising a base plate, said base plate providing a common closure for the bottom of said vessels, and having upwardly projecting flanges for supporting said vessels separated from one another, one of said upwardly projecting flanges dividing the base plate to provide a separated closure for each of said vessels, means for selectively introducing liquid into said vessels comprising a liquid supply pipe having branch connections projecting through said base plate into each of the vessels, an overflow pipe for each of the vessels projecting through said base plate said overflowing pipes communicating with one another below said base plate, and means for drawing off predetermined quantities of liquid from said vessels comprising a pivoted discharge spout in each vessel, said discharge spouts being each mounted for independent swinging movement within their respective vessels to position their intake ends at adjusted elevations in said vessels, discharge pipes communicating with each of said discharge spouts and communicating with one another outside of said vessels, and a delivery pipe common to both of said discharge pipes substantially as and for the purpose described.

In testimony whereof I have signed my name to this specification on this 15th day of January, A. D. 1920.

WILLIAM H. OPITZ.